US009094379B1

(12) United States Patent
Miller

(10) Patent No.: US 9,094,379 B1
(45) Date of Patent: Jul. 28, 2015

(54) TRANSPARENT CLIENT-SIDE CRYPTOGRAPHY FOR NETWORK APPLICATIONS

(75) Inventor: Kevin Miller, Herndon, VA (US)

(73) Assignee: Amazon Technologies, Inc., Seattle, WA (US)

(*) Notice: Subject to any disclaimer, the term of this patent is extended or adjusted under 35 U.S.C. 154(b) by 548 days.

(21) Appl. No.: 12/981,247

(22) Filed: Dec. 29, 2010

(51) Int. Cl.
H04L 9/00 (2006.01)
H04L 29/06 (2006.01)
H04L 9/08 (2006.01)
H04L 9/14 (2006.01)

(52) U.S. Cl.
CPC .......... H04L 63/045 (2013.01); H04L 9/08 (2013.01); H04L 9/14 (2013.01); H04L 63/04 (2013.01)

(58) Field of Classification Search
CPC ... H04L 63/045; H04L 63/0428; H04L 63/04; H04L 9/08; G06F 21/6209; G06F 21/60; G06F 21/602
USPC .............................................. 713/168; 724/4
See application file for complete search history.

(56) References Cited

U.S. PATENT DOCUMENTS

| 6,598,161 | B1* | 7/2003 | Kluttz et al. ................. 713/166 |
| 6,601,170 | B1 | 7/2003 | Wallace, Jr. |
| 6,748,367 | B1 | 6/2004 | Lee |
| 7,818,523 | B2 | 10/2010 | Norman |
| 7,945,520 | B2 | 5/2011 | Pizano et al. |
| 8,127,366 | B2 | 2/2012 | Vainstein et al. |
| 8,132,019 | B2 | 3/2012 | Springfield et al. |
| 8,213,608 | B2 | 7/2012 | Sandhu et al. |
| 8,266,438 | B2 | 9/2012 | Orsini et al. |
| 8,327,138 | B2 | 12/2012 | Nath et al. |
| 8,340,287 | B2 | 12/2012 | Sandhu et al. |
| 8,341,732 | B2 | 12/2012 | Croft et al. |
| 8,351,600 | B2 | 1/2013 | Resch |
| 8,359,476 | B2 | 1/2013 | Zizzi |
| 2002/0004784 | A1 | 1/2002 | Forbes et al. |
| 2002/0178366 | A1 | 11/2002 | Ofir |
| 2006/0173788 | A1 | 8/2006 | Pandya et al. |
| 2006/0277598 | A1 | 12/2006 | Ahn |
| 2007/0258585 | A1 | 11/2007 | Sandhu et al. |
| 2007/0258594 | A1 | 11/2007 | Sandhu et al. |

(Continued)

OTHER PUBLICATIONS

Yang, Li, "SecCMP: A Secure Chip-Multiprocessor Architecture", 2006, pp. 1-5, https://docs.google.com/viewer?a=v&q=cache:iQVR7KwI1wsJ:www.ece.lsu.edu/lpeng/papers/asid06.pdf+shamir+secret+sharing+algorithm+%2B+reconstructing+private+key&hl=en&gl=us&pid=bl&srcid=ADGEESgxXb9Tuf3LEXaSSEgMZ56wic_FMfnXyRvbVZ2CNhDNIwmoKrIS4DRmErH9flylzouTixS6ghGEvDtz__lyM.*

(Continued)

Primary Examiner — Kaveh Abrishamkar
Assistant Examiner — Carlos M De Jesus Lassaia
(74) Attorney, Agent, or Firm — Knobbe, Martens, Olson & Bear, LLP

(57) ABSTRACT

In one embodiment, a system and associated processes for transparent client-side cryptography are provided. In this system, some or all of a user's private data can be encrypted at a client device operated by the user. The client can transmit the encrypted user data to a content site that hosts a network application, such as a social networking application, financial application, or the like. The content site can store the private data in its encrypted form instead of the actual private data. When the content site receives a request for the private data from the user or optionally from other users (such as social networking friends), the server can send the encrypted user data to a client associated with the requesting user. This client, if operated by an authorized user, can decrypt the private data and present it to the authorized user.

30 Claims, 9 Drawing Sheets

(56) References Cited

U.S. PATENT DOCUMENTS

| | | | |
|---|---|---|---|
| 2007/0269041 | A1* | 11/2007 | Bhatnagar et al. .............. 380/30 |
| 2008/0031447 | A1* | 2/2008 | Geshwind et al. .............. 380/46 |
| 2010/0268945 | A1 | 10/2010 | Mereu et al. |
| 2010/0293099 | A1 | 11/2010 | Pauker et al. |
| 2011/0099379 | A1 | 4/2011 | Ganesan et al. |
| 2011/0170692 | A1 | 7/2011 | Konrad et al. |
| 2011/0219427 | A1 | 9/2011 | Hito et al. |
| 2012/0023332 | A1* | 1/2012 | Gorodyansky ............... 713/168 |
| 2012/0137122 | A1 | 5/2012 | Lu et al. |

OTHER PUBLICATIONS

Yang, Li, "SecCMP: A Secure Chip-Multiprocessor Architecture", 2006, pp. 1-5, https://d~cs.g~~g~e.c~m/viewer?a=v&q=cache:iQvR7Kw~1wsJ:www.ece.~su.edu/~peng/papers/asid~6.pdf+shamir+secret+sharing+a~g~rithm+%2B+rec~nstructing+private+key&h~=en&g~=us&pid=b~&srcid=ADGEESgxxb9Tuf3LExaSSEgMZ56wic-FMfnxyRy bVZ2CNh DNIwmoKrIS4DRm ErH9flylzouTixS6ghGEvDtz.*

Yang, Li, "SecCMP: A Secure Chip-Multiprocessor Architecture", 2006, pp. 1-5, https://d~cs.g~~g~e.c~m/viewer?a=v&q=cache:iQvR7Kw~1wsJ:www.ece.~su.edu/~peng/papers/asid~6.pdf+shamir+secret+sharing+a~g~rithm+%2B+rec~nstructing+private+key&h~=en&g~=us&pid=b~&srcid=ADGEESgxxb9Tuf3LExaSSEg MZ56wic- FMfnxyRv bVZ2CNh DNIwmoKr.*

Force et al., "Getting Started with Encrypted Custom Fields" 2008, pp. 1-5 http://help.salesforce.com/servlet/servlet.FileDownload?file=015300000034WpIAAE.*

Nanda et al., "Transparent Data Encryption" Sep. 2005, pp. 1-5, http://www.oracle.com/technetwork/issue-archive/2005/05-sep/o55security-100471.html.*

"Amazon Simple Storage Service Developer Guide", 2006, pp. 1-482, http://awsdocs.s3.amazonaws.com/S3/latest/s3-dg.pdf.*

Stuedi, Patrick, "Contrail: Enabling Decentralized Social Networks on Smartphones", Sep. 2010, pp. 41-60 http://research.microsoft.com/apps/pubs/default.aspx?id=139053.*

Beato, Filipe, "Enforcing Access Control in Social Netowrk Sites", Jun. 2009 (document properties of the pdf), pp. 1-10 http://citeseerx.ist.psu.edu/viewdoc/download?doi=10.1.1.153.8939&rep=rep1&type=pdf.*

Yang, Li, "SecCMP: A Secure Chip-Multiprocessor Architecture", 2006, pp. 1-5, http://www.ece.lsu.edu/lpeng/papers/asid06.pdf.*

Guha et al., "NOYB: Privacy in Online Social Networks" Aug. 2008, pp. 49-54 http://conferences.sigcomm.org/sigcomm/2008/workshops/wosn/papers/p49.pdf.*

Force et al., "Getting Started with Encrypted Custom Fields" 2008, pp. 1-5 http://help.salesforce.com/servlet/servlet. File Download?file=015300000034WpIAAE.*

Nanda et al., "Transparent Data Encryption" Sep. 2005, pp. 1-5, http://www.oracle.com/technetwork/issue-archive/2005/O5-sep/o55security-100471.html.*

BitLocker Drive Encryption Overview, http://windows.microsoft.com/en-US/windows-vista/BitLocker-Drive-Encyption-Overview, accessed on Dec. 29, 2010.

Using Encrypting File System, Published Nov. 3, 2005, http://msdn.microsoft.com/en-us/library/bb457116.aspx.

Shi Halevi, Public-key Crptography and Password, Aug. 1999, vol. 2., pp. 1-39.

Patrick Stuedi, Contrail: Enabling Decentralized Social Networks on Smartphones, Apr. 2011, Computer Science Journal, vol. 7049, pp. 41-60.

* cited by examiner

TRANSPARENT CLIENT-SIDE CRYPTOGRAPHY FOR NETWORK APPLICATIONS

RELATED APPLICATIONS

This application is related to the following applications, the disclosures of which are incorporated in their entirety by reference herein:

| Application Ser. No. | Filing Date | Title |
| --- | --- | --- |
| 12/981,291 | Dec. 29, 2010 | Network Application Encryption With Server-Side Key Management |
| 12/981,327 | Dec. 29, 2010 | Hybrid Client-Server Cryptography For Network Applications |

BACKGROUND

Traditional online services, such as banking, shopping, and social networking, rely on an exchange of user-identifying information to segregate and secure users' data. Typically, this is accomplished by associating a username and password with a specific user. Often, the online service will also obtain personal information about the user to help verify the user's identity, such as the user's social security number and the maiden name of the user's mother.

Many traditional online services share data about their users with other users of the service. In some cases the data is shared with the world at large, and in some cases, the data is shared with a specific subset of users. This access is again typically accomplished through a username and password system.

Some traditional online services attempt to provide a level of added security for its users by implementing a number of existing security protocols to facilitate communication security. For example, a number of services implement the Transport Layer Security (TLS) or the Secure Sockets (SSL) Layer protocols. Others use a Secure Shell (SSH) for data exchange.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

Introduction

Figure 1:
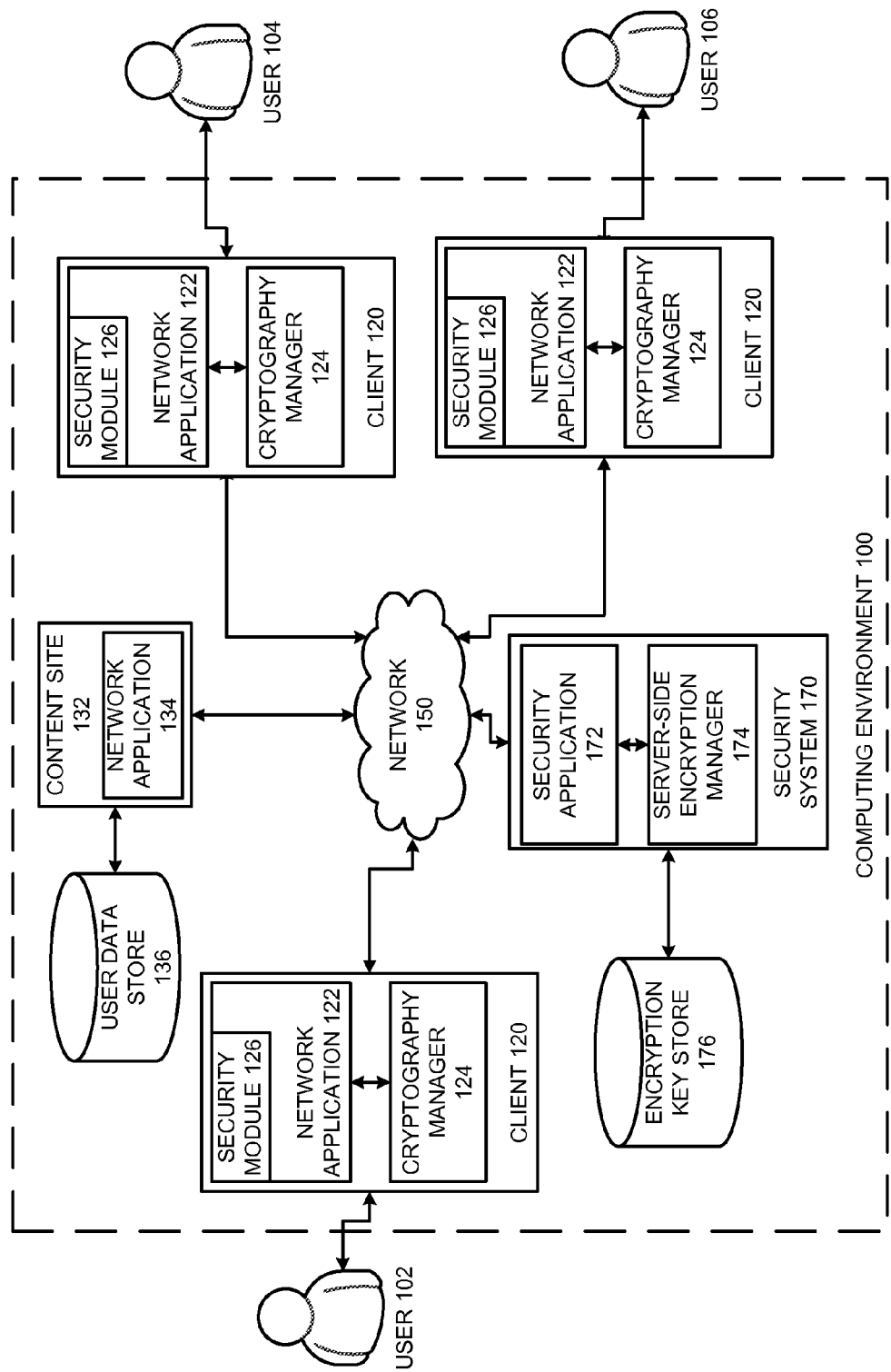
FIG. 1 illustrates an embodiment of a computing environment for securely sharing data over a network.

A number of online, network based, services require a user to trust the online service with both the security and privacy of data associated with the user. For example, many social networking services, such as Facebook, enable a user to share not only public, but also personal and private information about the user with friends, family, and other authorized users that the user selects or authorizes. However, there exist a number of security and privacy issues associated with these social networking sites and with other sites that have access to data associated with the user. For one, if the user incorrectly configures his or her account settings, much of the user's personal and private information may unintentionally become public. This would enable any user or system, including malicious users, data mining applications, and spammers to access the user's profile.

Even without the user incorrectly configuring his or her account settings, a hacker or malicious user may obtain access to the user's non-public information. Moreover, some social networking sites share user information with advertisers to enable user-specific advertising. This may result in both the sharing of information the user directly provided to the social networking site, as well as information not shared, but derived or mined from information that the user shared.

Some online services not only require the user's trust, but also require access to a number of user accounts the user may have with other online services. For example, some financial aggregation and evaluation services require access to a user's bank accounts, investment accounts, and loan accounts, to name a few. Each account that the user authorizes the financial aggregator service to access increases the user's risk of a security breach. Moreover, each added account increases the user's overhead because the user manually shares his or her account credentials with the service for each account as well as keeping the information up-to-date with the financial aggregator service.

This disclosure provides a number of example embodiments for improving the security and privacy of user information that has typically been stored with content sites in the clear. One embodiment provides a system and associated processes for transparent client-side cryptography for network applications. In this system, some or all of a user's data can be encrypted at a client device operated by the user. The client can transmit the encrypted user data to a content site that hosts a network application, such as a social networking application, financial application, or the like. The content site can store the user data in its encrypted form instead of the actual user data. When the content site receives a request for the user data from the user or optionally from other users (such as social networking friends), the server can send the encrypted user data to a client associated with the requesting user. This client, if operated by an authorized user, can decrypt the user data and present it to the authorized user. Advantageously, this system can reduce the risk of a user's user data at the content site being obtained without the user's permission. Further, this system can also reduce users' reliance on the content site's security mechanisms to protect the users' data.

In another embodiment, a system and associated processes for network application encryption with server key management are provided. In this system, some or all of a user's user data can be sent to a security system along with a list of authorized users. The security system can operate a service that encrypts the user data with an encryption key. Using public keys associated with the authorized users, the security system can also encrypt this encryption key. The security system can send the encrypted user data and keys to a content site, such as a social networking site, financial site, or the like. The content site can store the user data in its encrypted form until an authorized user requests a copy of the user data. When the content site receives a request for the user data, the server can send the encrypted user data to a client associated with the authorized user. This client can decrypt the user data and present it to the authorized user.

Many variations of these example systems and associated processes are described below in more detail with reference to the drawings.

Example Computing Environment

FIG. 1 illustrates an embodiment of a computing environment 100 for securely sharing data over a network 150. The example computing environment 100 includes client devices 120, a content site 132, a user data store 136, a network 150, a security system 170, and an encryption key store 176. In other embodiments, the computing environment 100 may include fewer or additional devices and systems.

The client devices 120 are examples of user systems or user devices that can generally include any computing device(s) capable of processing and communicating across the network 150. For example, the client device 120 can include a desktop, a laptop, or a wireless handheld device (such as a smart phone, PDA, tablet, or the like), to name a few. Note that while the client devices 120 are illustrated identically, it is possible for the client devices 120 to be different types of devices, to include different applications, or to otherwise be configured differently. Further, the network 150 may be a LAN, a WAN, the Internet, or a combination of the same.

The client devices 120 each include a network application 122, which can be any application that communicates over the network 150 with another application. Examples of network applications 122 include web browsers, thin or thick client applications, RSS or Atom feed readers, and the like. For ease of illustration, the remainder of this specification will refer to network applications 122 that are web applications. However, it should be understood that the network application 122 can be any type of application that can communicate over a network, and not just a web browser. For instance, the network application 122 can be an application on a wireless handheld device, such as an iPhone application or the like.

In the depicted embodiment, each of the network applications 122 includes a security module 126. The security module 126 can include any application that can direct user data from the network application 122 to the cryptography manager 124 for encryption. For instance, the security module 126 can direct or redirect user data that the users 102, 104, 106 inputted into a content page (such as a web page) to the cryptography manager 124. The security module 126 can process the data automatically, without user input, or upon user request (e.g., by selection of a button or other user interface control). Accordingly, the security module 126 can act as a security layer below the application layer-based network application. In doing so, the security module 126 can access, capture, intercept, or otherwise receive the user data from the network application 122 and direct or redirect it to the cryptography manager 124.

The cryptography manager 124 can encrypt the user data and return the encrypted user data to the security module 126, which forwards the encrypted user data to the content site 132. As a result, the security module 126 and cryptography manager 124 can facilitate storing user data securely at a remote content site 132. Thus, user data stored at the content site 132 can be less vulnerable to hacking from malicious users, loss, or other theft.

User data, encrypted and stored at the content site 132, can include private data and non-private data. In some embodiments, some of the user's data is stored unencrypted at the content site, such as some forms of non-private data. Different types of user data can also be subject to different levels of encryption, with more sensitive data being encrypted with stronger encryption, for example.

When a user 102, 104, to 106 requests to retrieve encrypted user data from the content site 132 with the network application 122, encrypted user data is returned. In other words, in certain embodiments, the content site 132 does not return decrypted data. Instead, the client device 120 can decrypt the encrypted user data. Accordingly, the security module 126 can direct, redirect, access, receive, capture, or otherwise intercept the encrypted user data retrieved by the network application 122. The security module 126 sends the encrypted user data to the cryptography manager 124 for decryption. Once the encrypted user data is decrypted, the security module 126 can provide the decrypted data to the network application 122, which can render or output the user data.

In one embodiment, the security module 126 is a plugin, script, extension, or add-on module to the network application 122, such as a plugin to a web browser. The security module 126 can also be a separate module from the network application 122. In other embodiments, the security module 126 is integrated with the network application 122 rather than being an add-on module.

The cryptography manager 124 can encrypt user data received from the security module 126 and package the encrypted user data in a format that can be stored on and accessed from the content site 132. Further, the cryptography manager 124 can decrypt the encrypted user data in response to the encrypted user data being accessed from the content site 132. The cryptography manager 124 can access operating system routines (e.g., using system calls) to perform encryption and decryption using any available encryption or decryption algorithm. The cryptography manager 124 may instead perform the encryption or decryption directly. Further, the cryptography manager 124 can be at least partially implemented in hardware, for example, by storing encryption keys in hardware, for security purposes.

The content site 132 can include any system that is capable of providing a network application, such as a web site or other web application. For example, the content site 132 may include a social networking application, a financial aggregation service, an online shopping service, an online gaming service, or the like. Moreover, the content site 132 can be implemented on one or more computing devices, such as physical servers.

The content site 132 can store encrypted user data in a user data store 136, which may be a database or other data repository implemented in physical computer storage. For example, the user data store 136 for a social networking content site 132 can store user data regarding friends, posts, profile settings, and the like. Advantageously, this user data is stored in an encrypted format according to embodiments described in detail herein. However, the user data store 136 may also store at least some of the user data in an unencrypted format. For instance, private user data can be encrypted and stored, while non-private (or less-private data) may be stored in cleartext. Many variations are possible.

While the client device 120 can encrypt and decrypt user data, in some embodiments, it may be desirable to have a separate, trusted system perform at least the encryption of the data. This separate system can be a storehouse of encryption keys as well, facilitating decryption by users other than the encrypting user. Accordingly, in the depicted embodiment, a security system 170 is provided that can include encryption, key storage, and optionally decryption features. The security system 170 may be implemented in one or more computing devices, such as servers, which may or may not be geographically co-located.

In one embodiment, the security system 170 includes a security application 172 and a server-side encryption manager 174. The security application 172 can include any application or system that can receive user data from a client device 120, send the user data to a server-side encryption manager for encryption, and send the encrypted user data to the content site 132. Moreover, the security application 172 can generally include any application or system for receiving encrypted user data, sending the encrypted user data to a server-side encryption manager for decryption, and sending the decrypted data to a client. The security application 172 is described in more detail below. The encryption key store 176 can be a data repository that stores cryptographic keys, facilitating multi-user decryption capabilities that will be described in greater detail below.

In operation, the security system 170 can receive cleartext user data from the client device 120. The security system 170 can then encrypt the user data and send the encrypted user data to the content site 132 for storage. In alternative embodiments, the content site 132 can directly implement the features of the security system 170. For instance, the client device 120 can send user data in cleartext to the content site 132, which encrypts and stores the encrypted data. The content site 132 can discard the cleartext user data, for example, according to an end-user license agreement or the like.

In other embodiments, the content site 132 itself can perform the functions of the security system 170. For instance, the content site 132 can receive user data, encrypt and store the user data, and manage keys for a plurality of users. The content site 132 can delete the user data subsequent to encrypting the user data to thereby at least partially protect the user data from being compromised.

Encrypting and Transmitting User Data—Overview

Figure 2:
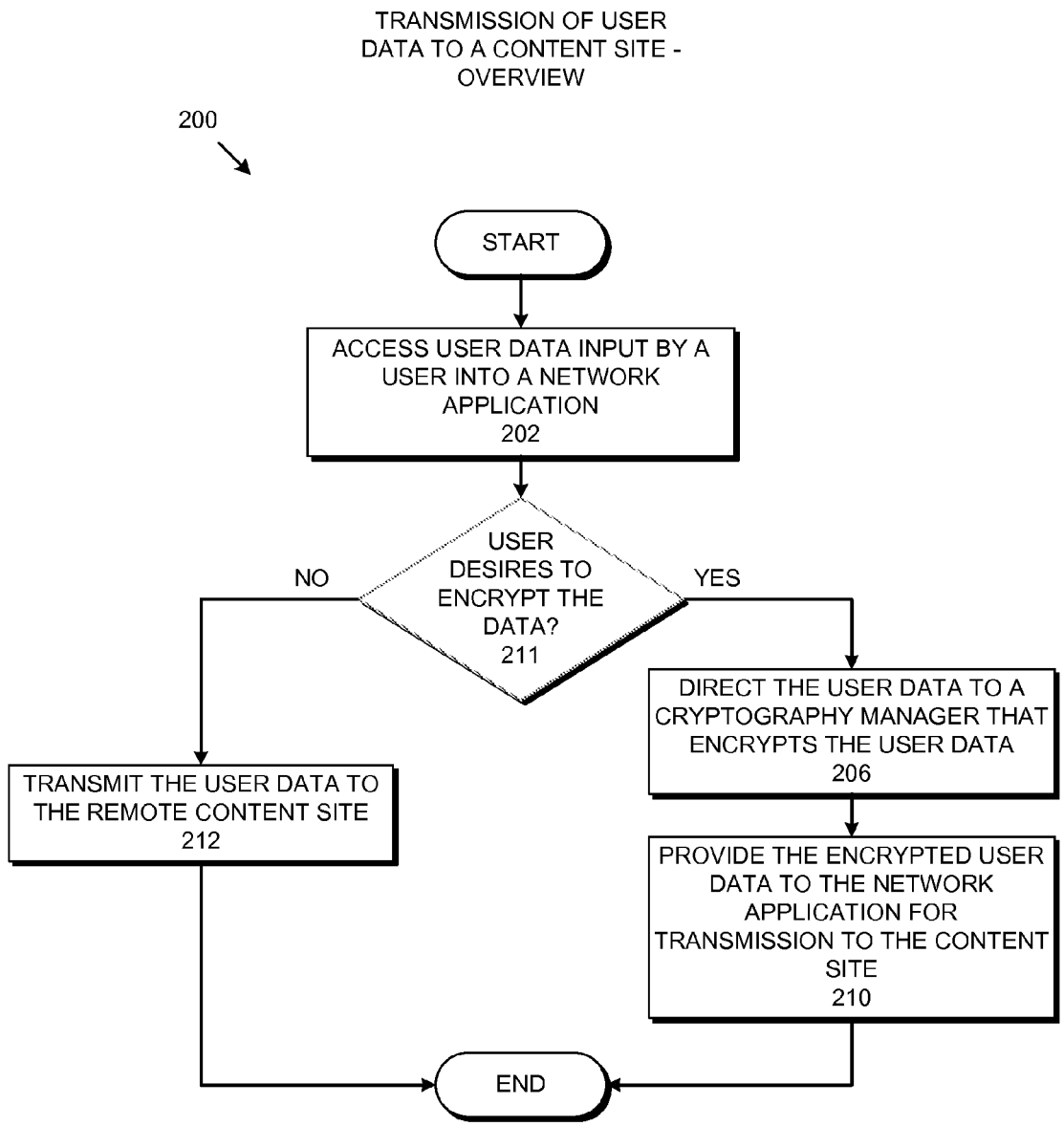
FIG. 2 illustrates a flow diagram for one embodiment of a process for transmitting user data to a content site.

FIG. 2 illustrates an embodiment of a process 200 for transmitting user data to a content site 132. The process 200 can be implemented by the security module described above with respect to FIG. 1. Advantageously, the process 200 can allow user data to be securely transmitted to and stored at a remote content site. Further, the process 200 can optionally be performed transparently to the user, without relying on any interaction by the user to encrypt the data.

The process 200 begins at block 202, where the security module 126 accesses, or otherwise receives user data from a network application 122 that is accessing the remote content site 132. In one implementation, the security module 126 accesses the user data from one or more fields in a web page form output by the network application 122. For example, if a user has accessed a social networking application to edit his or her profile, the web page form can be a profile form having fields such as name, address, and so forth. The security module 126 can access the data input by the user into the form.

The security module 126 can access the data automatically, without user input, or can access data in response to a user request to do so. For instance, the security module 126 can overlay a button on one or more fields in a web page or other content page that allows a user to select which fields to encrypt. The security module 126 could also or instead overlay a single button on a web page or other portion of a network application that allows a user to encrypt all the data input into the page.

At block 211, it is determined whether the user wishes to encrypt the user data. For instance, the user may manually select an "encryption" or "protection" button or the like provided by the security module 126. If the user desires encryption for the data, the data encrypted at block 206. Alternatively, if no encryption is desired, the security module 126 provides the user data to the network application 122, which transmits the user data to the remote content site 132. Block 211 can be optional in some embodiments, such that the user data is encrypted automatically without input from the user.

In one embodiment, a user sets or presets encryption preferences for the user data or for specific types of data. These encryption preferences can specify whether the pre-identified user data, or types of data, should be encrypted, must be encrypted, can, but need not be encrypted, or should not be encrypted, among other options. Setting the encryption preferences can involve configuring the security module 126, configuring the remote content site 132, or creating a preference file or white list. This white list can, for example, be an XML file or a CSV file, which is accessed by the security module 126 to identify encryption preferences.

In one embodiment, the security module 126 negotiates with the remote content site 132 to determine what data can be encrypted and cannot be encrypted. For example, if the user has specified that a phone number field should be encrypted, and the content site 132 requires that the phone number field remain unencrypted (e.g., due to data formatting constraints), the security module 126 and the content site 132 can negotiate whether to encrypt the phone number field. The content site 132 can specify, via metadata in one or more input fields of the content page, that encryption is not desired for such input fields. In one embodiment, the security module 126 acquiesces to the content site's 132 request for unencrypted data. In another embodiment, the security module 126 can override the content site's 132 request. The security module 126 can provide the user with an option to accept or override the request or to cancel the transaction.

At block 210, the encrypted user data is provided to the network application, which can transmit the encrypted data to the remote content site 132. Advantageously, the remote content site 132 can then store the encrypted user data in place of the user data itself. Storing encrypted user data with the content site 132 can beneficially mitigate the effect of malicious attacks from individuals attempting to steal private data from the content site 132. As a result, the user can have greater control over the security of the user's data.

Although not shown, in some implementations the security module 126 can automatically determine whether the user data includes private data and can encrypt the private data for transmission to the content site 132. This determination can be made automatically based on a variety of privacy characteristics associated with the data. For instance, these characteristics can include a tag, classifier, or identifier associated with the data indicating whether the data may be private (such as a "phone number" XML tag or the like).

Accessing User Data from a Content Site—Overview

Figure 3:
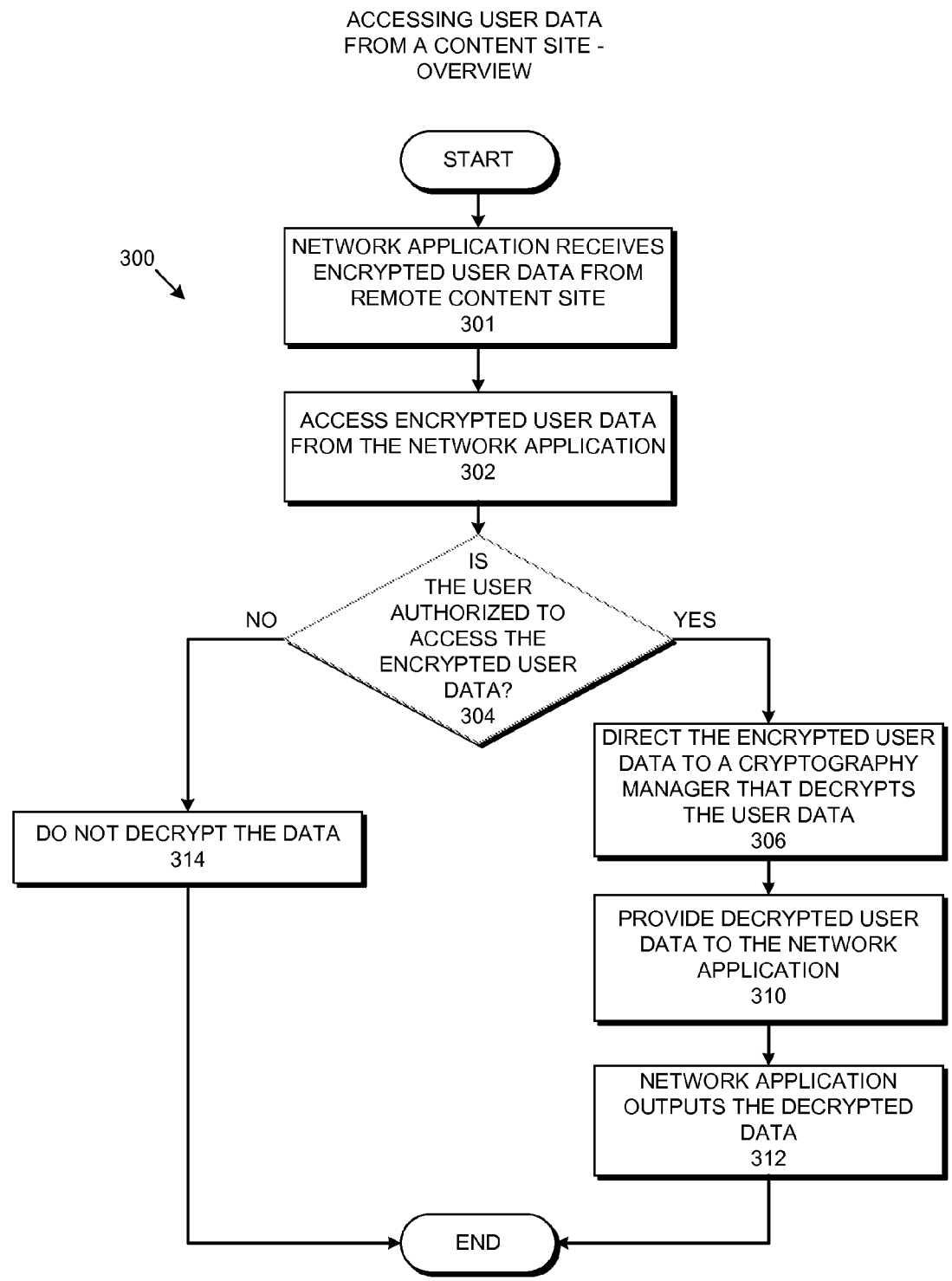
FIG. 3 illustrates a flow diagram for one embodiment of a process for accessing user data from a content site.

FIG. 3 illustrates an embodiment of a process 300 for accessing user data from a content site 132. In one embodiment, the process 300 can be used to access encrypted user data that is stored at a remote content site. The process 300 can advantageously be performed transparently to the user, without relying on any interaction by the user to decrypt the data.

At block 301, a network application receives encrypted user data from a content site. The encrypted user data might include a list of social networking friends, online banking details, or the like. At block 302, the encrypted user data is captured from the network application, for example, by the security module 126. In implementations where the network application is a browser, for instance, the security module 126 can retrieve or intercept the encrypted user data from content downloaded by the browser. The security module 126 can retrieve this encrypted user data prior to the network application (e.g., browser) displaying the encrypted data.

At block 304, it is determined whether a user is authorized to access the encrypted user data. This block can be implemented by the cryptography manager 124, for example, after receiving the encrypted user data from the security module 126. The determination of whether the user recipient is authorized to access the user data can include identifying whether the message includes an encryption key corresponding to the recipient of the message. Such keys are described in detail below with respect to FIGS. 4 and 5.

If the user is authorized to decrypt the data, the data is decrypted at block 306, e.g., by the cryptography manager 124. The decrypted user data is provided to the network application at block 310. For instance, the cryptography manager 124 can pass the decrypted data to the security module 126, which inserts the decrypted data in the page code of the network application. The network application can then output the decrypted data at block 312. In the example embodiment where the network application is a web browser, the network application can output the decrypted data on a web page or the like.

However, if the user is not authorized to access the user data, the data is not decrypted at block 314. An error might be displayed instead, or the encrypted data might be displayed. Alternatively, the encrypted user data can be removed and/or deleted by the security module 126, so that no data is displayed. Thus, unauthorized users may not even have access to the encrypted user data.

Encrypting and Transmitting User Data—Example Implementation

Figure 4:
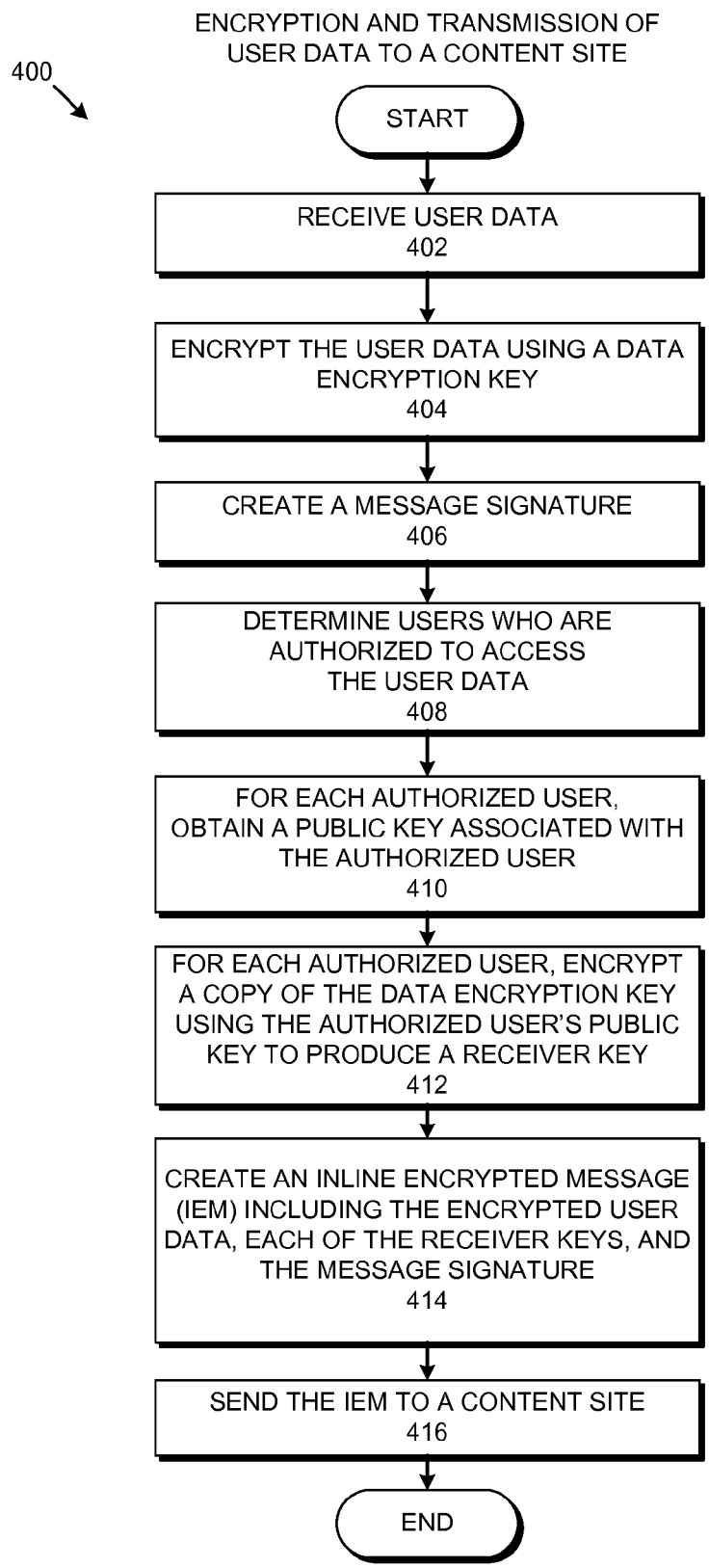
FIG. 4 illustrates a flow diagram for one embodiment of a process for encrypting and transmitting user data to a content site.

FIG. 4 illustrates a more detailed process 400 for encrypting and transmitting user data to a content site 132. The process 400 can be implemented by the cryptography manager 124 on a sending user's client device 120. The process 400 can advantageously be performed transparently to the user, without relying on any interaction by the user to encrypt the data.

In one embodiment, the process 400 is a more detailed implementation of block 206 of the process 200. The process 400 can be executed in response to the security module 126 sending intercepted user data to the cryptography manager 124. This user data is received at block 402.

At block 404, the cryptography manager 124 encrypts the user data using a data encryption key to obtain encrypted user data. In one embodiment, the data encryption key is a symmetric key. The cryptography manager 124 may generate the data encryption key. Alternatively, the cryptography manager 124 obtains the data encryption key from a client key store associated with a client device.

In one embodiment, the user data encrypted at block 404 can be formatted according to a markup language or tagging language for easier manipulation once downloaded from a content site. For example, the user data can include Hyper-Text Markup Language (HTML), eXtensible Markup Language (XML), JavaScript Object Notation (JSON), or the like. Further, in some implementations, the cryptography manager 124 can also encrypt executable code or instructions together with the user data. This code can be executed by a client device upon later decrypting the user data.

At block 406, the cryptography manager 124 creates a message signature associated with the user (or the client device). Note that this operation is optional. The cryptography manager 124 determines at block 408 which users are authorized to access the user data. The set of authorized users can include the owner and or creator of the user data, such as the user. The cryptography manager 124 can determine the set of authorized users based on a list of users provided by the user. Alternatively, the cryptography manager 124 can obtain a list of authorized users from the content site 132, such as a list of friends associated with the user or a list of users associated with a pre-defined group of users, which may or may not include the user. As another alternative, the cryptography manager 124 can generate a list of authorized users based on information gathered from multiple content sites that user accesses.

For each authorized user, the cryptography manager 124 obtains a public key associated with the authorized user at block 410. In one embodiment, the public key is part of a public/private key pair associated with the authorized user. The cryptography manager 124 can obtain the public key from the remote encryption key store 176 (see FIG. 1) or directly from the authorized user. The public key may also be obtained from the content site 132.

At block 412, for each authorized user, the cryptography manager 124 encrypts a copy of the data encryption key using the authorized user's public key to produce a receiver key for the authorized user. The cryptography manager 124 creates an inline encrypted message (IEM) associated with the user data at block 414. This IEM can include the encrypted user data, a receiver key for each authorized user, and, optionally, the message signature. The IEM can also include unencrypted user data in some implementations.

In one embodiment, the IEM can be of any encoding format. For example, the IEM can use ASCII encoding, Base64 encoding, Base32 encoding, Radix64 encoding or binary encoding, to name a few. Further, the process 400 can create one IEM for a set of user data or multiple IEMs for a set of user data. For instance, the process 400 can create one IEM for data submitted in a web form by a user or possibly one IEM for each field or group of fields in the form.

The IEM is sent to the content site 132 at block 416. In one embodiment, the cryptography manager 124 provides the IEM to the security module 126, which can send the IEM to the content site. The security module 126 can also send the IEM to the network application, which can instead send the IEM to the content site.

The data encryption key and/or the public keys of the authorized recipients can be configured in the user's client device as a one-time initialization step (not shown). For instance, the user can first receive public keys from other users with whom the user wishes to share data. Once the client device has received these keys, in one embodiment, the client device can implement the process 400 of FIG. 4. In some scenarios, the client device receives updated public keys from other users periodically. Further, the cryptography manager 124 can change the data encryption key periodically to enhance security.

In one embodiment, a subset of the authorized users has authorization to access a subset of the user data. In this embodiment, the subset of the user data is encrypted with one data encryption key and the remainder of the user data is encrypted with a second data encryption key. For an authorized user who is authorized to access all of a set of user data, the cryptography manager 124 can use the authorized user's receiver key to encrypt a copy of each data encryption key. For an authorized user who is authorized to access a subset of the user data, the cryptography manager 124 can use the authorized user's receiver key to encrypt the copy of the data encryption key associated with the subset of the user data.

As an example, a user may wish to be able to access all of his or her banking data on a banking site. However, the user may wish to share a portion of this banking data with a financial aggregator site that provides personal financial planning features. The user can therefore request the cryptography manager 124 (e.g., through a user interface) to encrypt all the banking data to the user's own receiver key and to separately encrypt a portion of the banking data to the financial aggregator site's receiver key. The two encrypted versions of the data can be packaged into a single IEM for storage at the banking site (or optionally multiple IEMs). The financial aggregator site can then access the relevant IEM from the banking site, decrypt the relevant user data, and perform personal financial planning functions without full access to the user's banking data. Dividing the user data into such separate classes can advantageously provide different subsets of users with different levels of authority to access different portions of the user data.

In one embodiment, the user data is a private key associated with the user. This embodiment can be used for recovering a private key if it is lost, or if the client device 120 stops functioning. For example, the user can divide a private key associated with the user into some number of portions (such as five). The user can then use the process described with respect to FIG. 4 to authorize, for each of the five portions of the private key, a trusted user to access the portion of the private key. If the user loses access to the private key, the user can request that the five trusted users each, using the process described with respect to FIG. 5 below, access the portion of the private key entrusted to the trusted user and send it to the user. The user, or a new client associated with the user, can then use the five portions of the private key to recreate the user's lost private key. The user can then use the recreated private key and the process described with respect to FIG. 5 below to access any additional user data on the content site 132 that the user is authorized to access. The user can use this same process to recover a private key associated with user data on a personal store (not shown), such as a backup storage device. Note that this embodiment can be used to recover a lost receiver key, or any other type of private key.

In one embodiment, a secret sharing algorithm can be used to recover a lost key (e.g., a lost private key). For example, the cryptography manager 124 can use the sharing algorithm to generate 'n' pieces of recovery information associated with the private key. The cryptography manager 124 can use T of the 'n' pieces of recovery information to recreate the lost private key. Note that T can be less than or equal to 'n'. These 'n' pieces of recovery information can then be distributed to 'n' trusted users or 'n' trusted devices. If the private key is lost, the user or cryptography manager 124 can obtain T pieces of the recovery information from the trusted users or devices and the cryptography manager 124 can then recreate the lost private key.

In another implementation, the security module 126 can allow a user to add or remove recipients from an IEM stored with the content site 132. One way to add or remove a recipient would be for the user to recreate the IEM with an adjusted recipient list. To add a recipient, the security module 126 can retrieve the IEM stored with the content site 132 and direct it to the cryptography manager 124 for decryption of the data encryption key and/or the entire IEM. The cryptography manager 124 can then encrypt the data encryption key using the new recipient's public key to create a new receiver key. The cryptography manager 124 can add this receiver key to the IEM to create a new IEM, and the security module 126 can resubmit the new IEM to the content site 132 for storage in place of the old IEM. Similarly, the cryptography manager 124 can delete a recipient's receiver key, and the security module 126 can resubmit the IEM to the content site 132 for storage.

Alternatively, if the content site 132 supports adding new recipients, the security module 126 can send the public key of the new recipient to the content site (or indicate which recipient to add, if the content site 132 already has the public key). The content site 132 can then add the recipient to the stored IEM. Deletion can be performed in a similar manner by instructing the content site 132 to delete a recipient's receiver key.

Receipt and Decryption of User Data—Example Implementation

Figure 5:
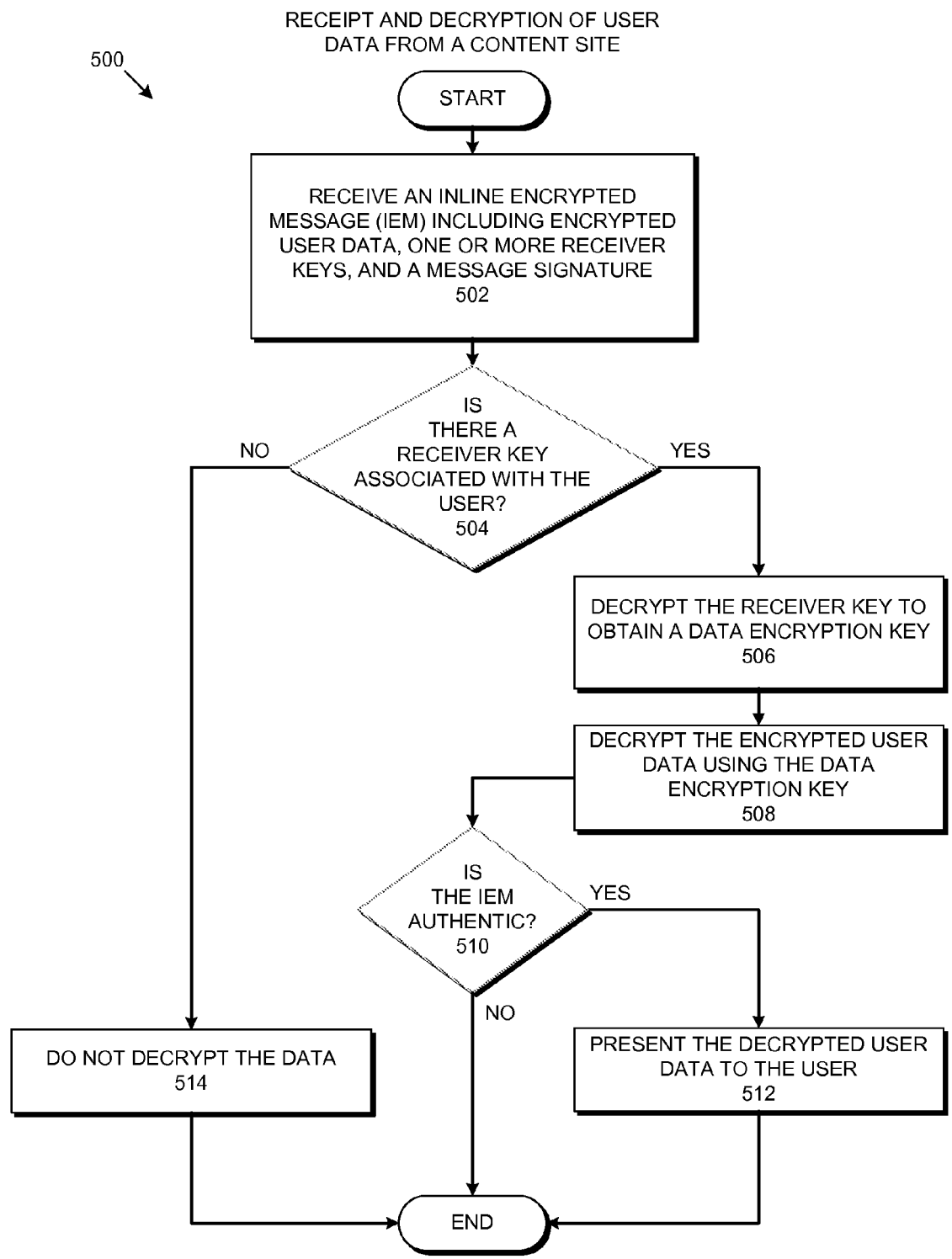
FIG. 5 illustrates a flow diagram for one embodiment of a process for receiving and decrypting user data from a content site.

FIG. 5 illustrates an embodiment of a process 500 for receiving and decrypting user data from a content site 132. The process 500 can be implemented by the cryptography manager 124 on a receiving user's client device 120. In one embodiment, the process 500 is a more detailed implementation of the process 300 of FIG. 3. The process 500 can advantageously be performed transparently to the user, without relying on any interaction by the user to decrypt the data.

The process 500 can be executed in response to the security module 126 sending intercepted encrypted user data received from to a content site to the cryptography manager 124. This encrypted user data, in the form of an IEM, is received at block 502. As described above, the IEM can include encrypted user data, a plurality of receiver keys, and, optionally, a message signature.

At block 504, the cryptography manager 124 determines whether the plurality of receiver keys includes a receiver key associated with the user receiving the IEM. If there is not a receiver key associated with the user, then the cryptography manager 124 does not decrypt the data (block 514). In one embodiment, block 504 involves determining whether a private key associated with the user can decrypt a receiver key from the plurality of receiver keys. As described above with respect to FIG. 4, the receiver key can be generated with a receiving user's public key. Thus, the same receiving user can use a private key associated with this public key to decrypt the receiver key.

If the cryptography manager 124 determines that there is a receiver key associated with the user, the cryptography manager 124 decrypts the receiver key to obtain a data encryption key (block 506). In one embodiment, decrypting the receiver key involves using a private key that is part of a public/private key pair associated with the user. This private key can be stored by the client 140, the encryption key store 176, a hardware key-manager associated with the client 140 or the user, a software key-manager associated with the client 140 or the user, or any other system for storing a private key associated with a public/private key pair.

After obtaining the data encryption key, the cryptography manager 124 uses the data encryption key to decrypt the encrypted user data at block 508. At block 510, the cryptography manager 124 can authenticate the IEM by verifying the message signature associated with the IEM. In one embodiment, operation 510 is optional (e.g., the IEM does not include a message signature). Verifying the message signature can include one determining whether the signature matches an expected signature of the sending user.

If the cryptography manager 124 determines that the IEM is authentic, the cryptography manager 124 causes the decrypted user data to be presented to the user at block 512. For instance, the cryptography manager 124 can provide the user data to the security module 126, which provides the user data to the network application. If the cryptography manager 124 determines that the IEM is not authentic, the process 500 ends. For example, the cryptography manager 124 may cause an error message to be displayed to the user.

In one embodiment, a combination of the processes described with respect to FIGS. 4-5 can be used to update the set of authorized users who can access the user data. For example, the user can access user data from the content site 132 with the help of the process described with respect to FIG. 5. The user can then add a new user, such as a user 106, to the list of authorized users. The user can also remove a user, such as a user, from the list of authorized users. The user can then provide the user data with the updated list of authorized users to the content site 132 with the help of the process described with respect to FIG. 4. In one embodiment, this same process can be used to update the receiver keys used encrypt the data encryption key. For example, using the process described with respect to FIG. 5, the cryptography manager 124 can decrypt a data encryption key associated with an IEM. The cryptography manager 124 can then use the process described with respect to FIG. 4 to encrypt the data encryption key using a new receiver key associated with each authorized user. A new IEM can then be created and provided to the content site 132.

In one embodiment, a combination of the processes described with respect to FIGS. 4-5 can be used to update the user data. For example, the user can access user data from the content site 132 with the help of the process 500 described with respect to FIG. 5. The user can then update the user data by modifying, adding, or deleting a portion of the user data. The user can then provide the updated user data to the content site 132 with the help of the process 400 described with respect to FIG. 4.

In one embodiment, updating the set of authorized users who can access the user data and/or updating the user data involves creating a new IEM. This new IEM is then sent to the content site 132, which can replace the IEM associated with the previous set of authorized users and/or the old user data with the new IEM associated with the updated set of authorized users and/or updated user data.

Example Encryption of User Data Using a Security System

As described above with respect to FIG. 1, a security system 170 or the content site 132 can, in some implementations, encrypt the user data instead of (or in addition to) the client device performing this function. Embodiments for using a trusted server system, such as a security system 170 or content site 132, will now be described. For ease of illustration, these embodiments are described in the context of the security system 170. However, it should be understood that these features may be equally applied to the content site 132 in certain embodiments. Further, it should be understood that the security system 170 and/or the content site 132 can perform some or all of the functionality of the security module 126 and/or cryptography manager 124 in certain embodiments.

Figure 6:
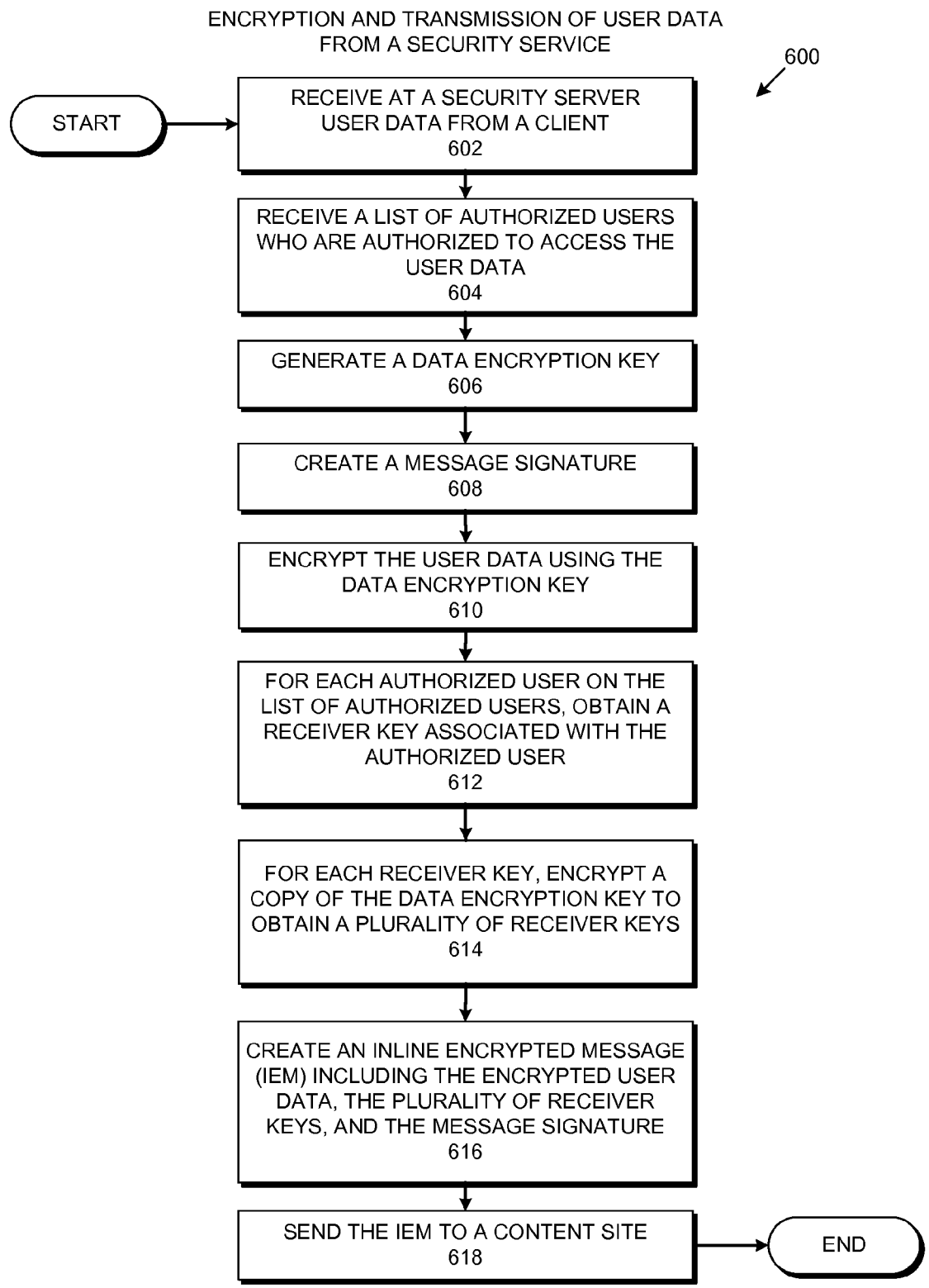
FIG. 6 illustrates a flow diagram for one embodiment of a process for using a security system to encrypt and transmit user data to a content site.

FIG. 6 illustrates an embodiment of a process 600 for using a security system 170 to encrypt and transmit user data to a content site 132. In one embodiment, the process 600 begins when a security application 172 associated with the security system 170 receives user data from a client device 120, which security application 172 then passes to a server-side encryption manager 174 (operation 602). In one embodiment, the security application 172 receives the user data from a security module 126. Alternatively, the security application 172 receives the user data from a network application 122. The security module 126 or network application 122 can use a secure communications channel (such as an encrypted channel) to send the data to the security application 172.

Next, the security application 172 receives a list of authorized users who are authorized to access the user data (operation 604). Note that the list of authorized users can include the owner and/or creator of the user data, such as the user and the client device 120. In one embodiment, the security application can receive the list of authorized users from one of: the client device 120, the security module 126, the network application 122, or any other system that can provide the list of authorized users to the security application 172. In one embodiment, the security application 172 receives the list of authorized users from one or more of the content site 132 and the user data store 136. In one embodiment, the list of authorized users can be a set of friends associated with the user or a set of service providers, such as online banking services and financial data aggregators like mint.com, that are authorized to access user data associated with the user.

After receiving the user data, the server-side encryption manager 174 generates a data encryption key (operation 606). Alternatively, the server-side encryption manager 174 obtains the data encryption key from an encryption key store 176 or from an external key generator (not shown). In one embodiment the data encryption key is a symmetric key.

Next, the server-side encryption manager 174 creates a message signature (operation 608). This message signature can be associated with one or more of the user, the client device 120, and the security system 170. In one embodiment, creating the message signature is optional.

Then, the server-side encryption manager 174 encrypts the user data using the data encryption key to obtain encrypted user data (operation 610). In one embodiment, once the server-side encryption manager 174 has encrypted the user data, the server-side encryption manager 174 deletes any unencrypted copies of the user data on security system 170. At this point, in certain embodiments, the security system 170 has access only to the encrypted copy of the user data. Alternatively, the security system 170 need not delete the user data in certain embodiments.

Next, for each authorized user on the list of authorized users, the server-side encryption manager 174 obtains a receiver key associated with the authorized user (operation 612). In one embodiment, the server-side encryption manager 174 obtains these receiver keys from one or more of the security application 172, the encryption key store 176, the content site 132, the authorized users, such as the user, and clients associated with the authorized users, such as the client 140. In one embodiment, the receiver keys are public keys which are part of public/private key pairs associated with the authorized users.

Then, for each receiver key, the server-side encryption manager 174 encrypts a copy of the data encryption key to obtain a plurality of receiver keys (operation 614). In one embodiment, once the server-side encryption manager 174 has encrypted each copy of the data encryption key, the server-side encryption manager 174 deletes any unencrypted copies of the data encryption key on security system 170. At this point, the security system 170 has access only to the plurality of receiver keys.

The server-side encryption manager 174 then creates an IEM, which includes the encrypted user data, the plurality of receiver keys, and, optionally, the message signature (operation 616). Subsequently, the server-side encryption manager 174 sends, or causes one or more of security application 172 and security system 170 to send, the IEM to the content site 132 (operation 618). Operation 618 may be omitted if the content site 132 is performing the functions of the security system 170 described with respect to FIG. 6.

In one embodiment, server-side encryption manager 174 includes the functionality of cryptography manager 124. For example, server-side encryption manager 174 can divide the user data into multiple segments and create multiple IEMs. As described with respect to the cryptography manager 124 in FIG. 4, dividing the user data can facilitate reducing the size of the IEMs or providing different subsets of users associated with different levels of authority with access to different portions of the user data.

The user may not be aware that the process described with respect to FIG. 6 is occurring in some scenarios. In this embodiment, the user may initiate the transmission of the user data by, for example, providing the user data and indicating a desire to send the user data to the content site 132. At this point, the process described with respect to FIG. 6 occurs without any further interaction with the user. In one embodiment, the user is aware that the process described with respect to FIG. 6 occurs because, for example, the user configures the client device 120 to interact with the security system 170. However, the user may or may not be aware of the individual operations or of any particular occurrence of the process described with respect to FIG. 6.

Further, it should be noted that in some embodiments, the security system 170 can receive user data from a client device over a network, encrypt the user data to produce encrypted user data, and create recipient data reflecting one or more recipients authorized to decrypt the encrypted user data. In addition, the security system 170 can create an encryption message using any of the techniques described above, e.g., for creating an IEM. This encryption message can include the encrypted user data and the recipient data. The security system 170 can provide the encryption message to the client device over the network, thereby enabling the client device, in certain embodiments, to transmit the encryption message to a remote content site for storage.

Advantageously, in certain embodiments, the encryption message is structured by the security system 170 so as to conform to storage requirements at the content site. Examples of storage requirements or specifications can include a maximum string length, an encoding type (such as ASCII or UTF-8), and the like. These storage requirements can be specified by the content site in form fields of content pages accessed by the network application 122. If the content site 132 does not specify the storage requirements, the security module 126 can perform out-of-band tests with test data, sending the test data to the content site to determine whether it meets the content site's 132 storage requirements.

If the encrypted message does not conform with the storage specifications of the content site, the encryption message can be stored on a server (such as the security system 170) and a network address to the encryption message (such as URL) can be provided. The network address can be transmitted to the content site for storage. Thus, when a client device attempts to access a content page that uses the encrypted user data, the content site can return the URL to the client device. The security module of the client device can resolve the URL to retrieve the encryption message from the security system 170 and can then pass the encryption message to the cryptography module for decryption. It should be noted that the network addressing features, including storing a URL at the content site pointing to the encryption message, can also be implemented with the client-side encryption scenarios described above.

The security system 170 (or the content site 132) can be used to bootstrap or otherwise ramp-up a public key infrastructure in some implementations. For instance, in a social networking scenario, the security system 170 can store public keys for users' friends. When creating IEMs, the security system 170 can automatically add a user's friends as authorized recipients to the IEMs. Further, a user can use the security system 170 to automatically generate a list of friends that have access to particular user data.

In some embodiments, the client device passes user data in cleartext to the security system 170. In other implementations, the client device encrypts the user data to a receiver key owned by the security system 170. The security system 170, upon receipt of the encrypted user data, can decrypt it using the receiver key and then re-encrypt the user data with other recipient's receiver keys.

Moreover, the security system 170 can pass IEMs directly to the content site upon creation. Alternatively, the security system 170 can return an IEM to the client device, which then passes the IEM to the content site.

It should also be noted, both for the client-side encryption and security system encryption scenarios, that such encryption of user data and storing the encrypted user data can reduce or eliminate username and password requirements to access the data. Since the user data is stored encrypted, any unauthorized user who attempts to access it may not be able to read it. Thus, a username and password can be eliminated, even for financial sites such as online banking sites. Removing username and password requirements can be particularly beneficial in some embodiments for users of handheld devices, which typically have small keypads or keyboards that make password entry cumbersome.

Decryption of User data Using a Security System

Figure 7:
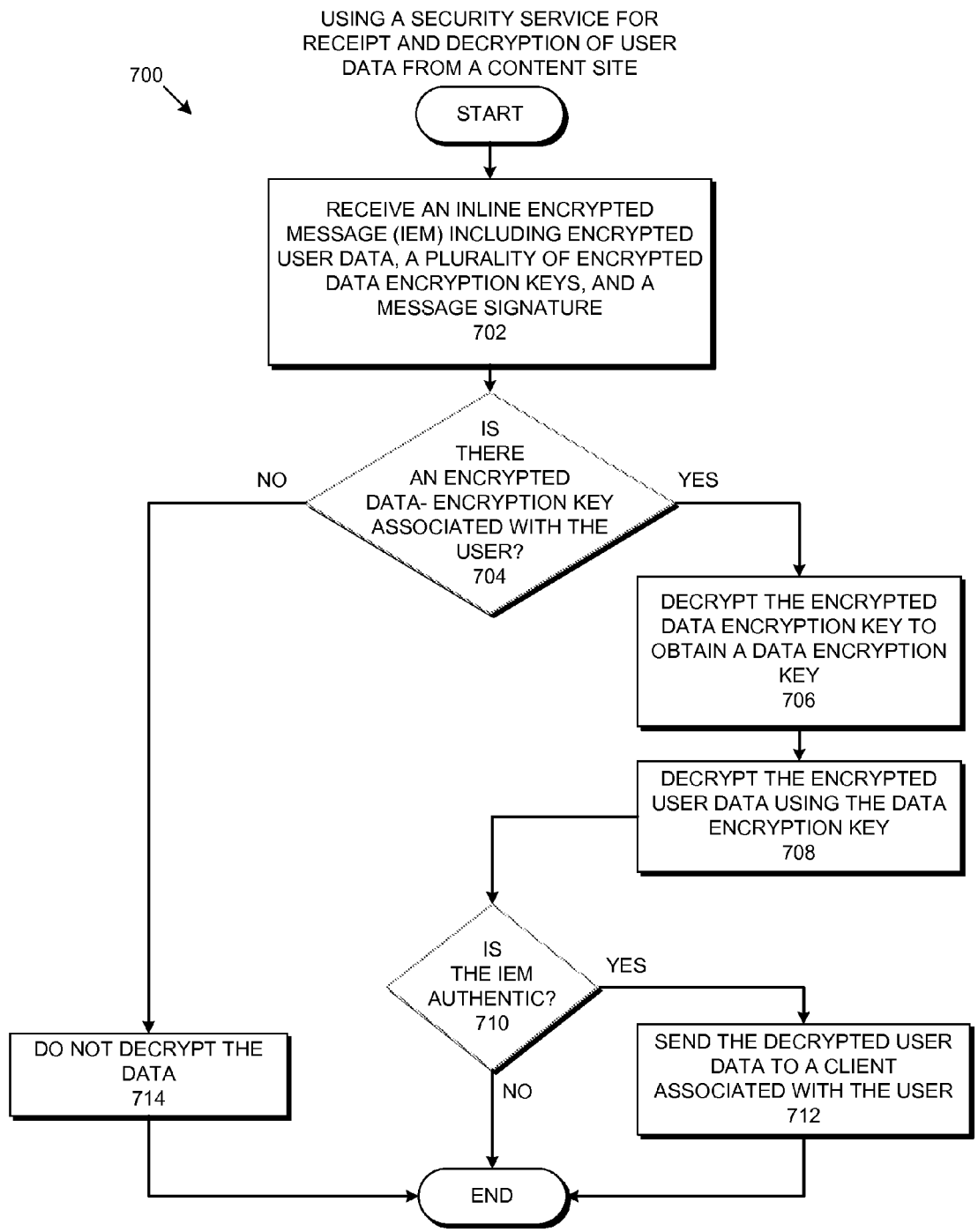
FIG. 7 illustrates a flow diagram for one embodiment of a process for using a security system to receive and decrypt user data from a content site.

FIG. 7 illustrates a flow diagram for one embodiment of a process for using a security system 170 to receive and decrypt user data from a content site 132. In one embodiment, the process begins when, in response to a user's action, a security application 172 associated with the security system 170 receives an IEM from the content site 132, which security application 172 then passes to a server-side encryption manager 174 (operation 702). As described above, the IEM can include encrypted user data, a plurality of receiver keys, and, optionally, a message signature. In one embodiment, the process begins in response to a client 140 or a network application 142 causing the security application 172 to receive the IEM from the content site 132. In one embodiment, the content site 132 sends the IEM to the security application 172 without the content site 132 receiving a specific request for the IEM.

In one embodiment, the security system 170 receives data, e.g., from a client device. The security application 172 then determines if the data packet includes an IEM. If so, the IEM is passed to the server-side encryption manager 174. Otherwise, the data packet is forwarded to the client 140.

The server-side encryption manager 174 then determines if the plurality of receiver keys includes a receiver key associated with the user (operation 704). If there is not a receiver key associated with the user, then the server-side encryption manager 174 may optionally cause an error message to be sent to the client 140 (operation 714).

In one embodiment, security application 172 performs operation 704. In this embodiment, the security application 172 passes the IEM to the server-side encryption manager 174 if the security application 172 identifies a receiver key associated with the user. If there is not a receiver key associated with the user, then the security application 172 may optionally cause an error message to be sent to the user via the client 140. In one embodiment, if the security application 172 identifies a receiver key associated with the user, then the security application 172 sends the identified receiver key, the encrypted user data, and, optionally, the message signature to the server-side encryption manager 174.

In one embodiment, operation 704 involves determining if the plurality of receiver keys includes a receiver key tagged with an identifier associated with the user. Alternatively, operation 104 involves determining if a private key that is part of a public/private key pair associated with the user can decrypt a receiver key from the plurality of receiver keys.

If the server-side encryption manager 174 determines that there is a receiver key associated with the user, the server-side encryption manager 174 decrypts the receiver key to obtain a data encryption key (operation 706). In one embodiment, decrypting the receiver key involves using a private key that is part of a public/private key pair associated with the user. In one embodiment, the private key can be stored by the security system 170, the encryption key store 176, or any other system for storing a private key associated with a public/private key pair that is accessible by the security system 170. Alternatively, the private key is stored by the client 140, a hardware key-manager associated with the client 140 or the user, a software key-manager associated with the client 140 or the user, or any other system for storing a private key associated with a public/private key pair that is accessible by the user or the client 140. In this embodiment, the security system 170 obtains the private key from client 140.

After obtaining the data encryption key, the server-side encryption manager 174 uses the data encryption key to decrypt the encrypted user data (operation 708). In one embodiment, the data encryption key is associated with a subset of the user data. In this embodiment, the server-side encryption manager 174 uses the data encryption key to decrypt the subset of the encrypted user data.

Next, the server-side encryption manager 174 authenticates the IEM by verifying the message signature associated with the IEM (operation 710). In one embodiment, operation 710 is optional. In one embodiment, the IEM does not include a message signature. In this embodiment, operation 710 is not performed. In one embodiment, verifying the message signature can involve one or more operations including: determining if an unauthorized user has altered the user data; determining if an identified author of the user data differs with an expected author of the user data; determining if the user data is authentic; and any other message verification process or authentication process.

If the server-side encryption manager 174 determines that the IEM is authentic, the server-side encryption manager 174 causes the decrypted user data to be sent to the client 140 associated with the user (operation 712). If the server-side encryption manager 174 determines that the IEM is not authentic, the server-side encryption manager 174 may optionally cause an error message to be sent to the client 140 associated with the user (operation 714).

In one embodiment, if the server-side encryption manager 174 determines that the IEM is not authentic or if the server-side encryption manager 174 is unable to authenticate the IEM, the server-side encryption manager 174 can cause the decrypted data to be sent to the client 140. In this embodiment, sending the decrypted data to the client 140 can involve sending a warning message to the client 140 indicating that the user data was not authenticated, or failed authentication. In one embodiment, if the IEM is not authentic or has not been authenticated, the user can request that the data still be sent to the client 140.

In one embodiment, the user may or may not be aware that the process described with respect to FIG. 7 is occurring. In this embodiment, the user may initiate the receipt of the user data by, for example, requesting the user data from content site 132 via the network application 142. At this point, the process described with respect to FIG. 7 occurs without any further interaction with the user. In one embodiment, the user is aware that the process described with respect to FIG. 7 occurs because, for example, the user configures the client 140 to interact with the security system 170. However, the user may or may not be aware of the individual operations or of any particular occurrence of the process described with respect to FIG. 7.

In one embodiment, a combination of the processes described with respect to FIGS. 6-7 can be used to update the set of authorized users who can access the user data. For example, the user can access user data from the content site 132 with the help of the process described with respect to FIG. 7. The user can then add a new user, such as a user 106, to the list of authorized users. The user can also remove a user, such as a user, from the list of authorized users. The user can then provide the user data with the updated list of authorized users to the content site 132 with the help of the process described with respect to FIG. 6. In one embodiment, this same process can be used to update the receiver keys used encrypt the data encryption key. For example, using the process described with respect to FIG. 7, the server-side encryption manager 174 can decrypt a data encryption key associated with an IEM. The server-side encryption manager 174 can then use the process described with respect to FIG. 6 to encrypt the data encryption key using a new receiver key associated with each authorized user. A new IEM can then be created and provided to the content site 132.

In one embodiment, a combination of the processes described with respect to FIGS. 6-7 can be used to update the user data. For example, the user can access user data from the content site 132 with the help of the process described with respect to FIG. 7. The user can then update the user data by modifying, adding, or deleting a portion of the user data. The user can then provide the updated user data to the content site 132 with the help of the process described with respect to FIG. 6.

In one embodiment, updating the set of authorized users who can access the user data and/or updating the user data involves creating a new IEM. This new IEM is then sent to the content site 132, which can replace the IEM associated with the previous set of authorized users and/or the old user data with the new IEM associated with the updated set of authorized users and/or updated user data.

In one embodiment, the use of the security system 170 enables a user, such as the user, to practice the teachings of this disclosure without being associated with a client that includes the security module 126 or the cryptography manager 124. In one embodiment, some users can practice the teachings of this disclosure that relate to the security module and the cryptography manager while other users practice the teachings of this disclosure that relate to the security system 170. In this embodiment, both sets of users can share user data with each other via the content site 132 or directly.

Example Hybrid Client-Server Cryptography

Figure 8:
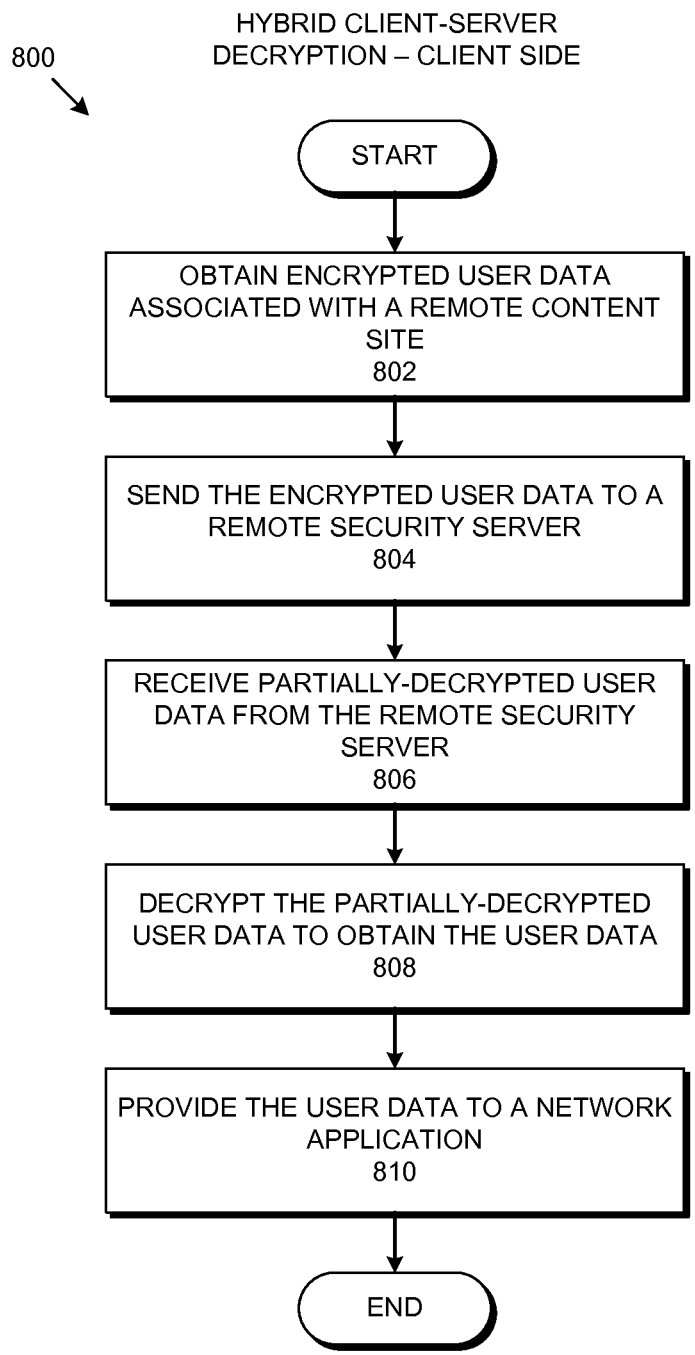
FIG. 8 illustrates a flow diagram for one embodiment of a hybrid client-server cryptography process, from the client point of view.
Figure 9:
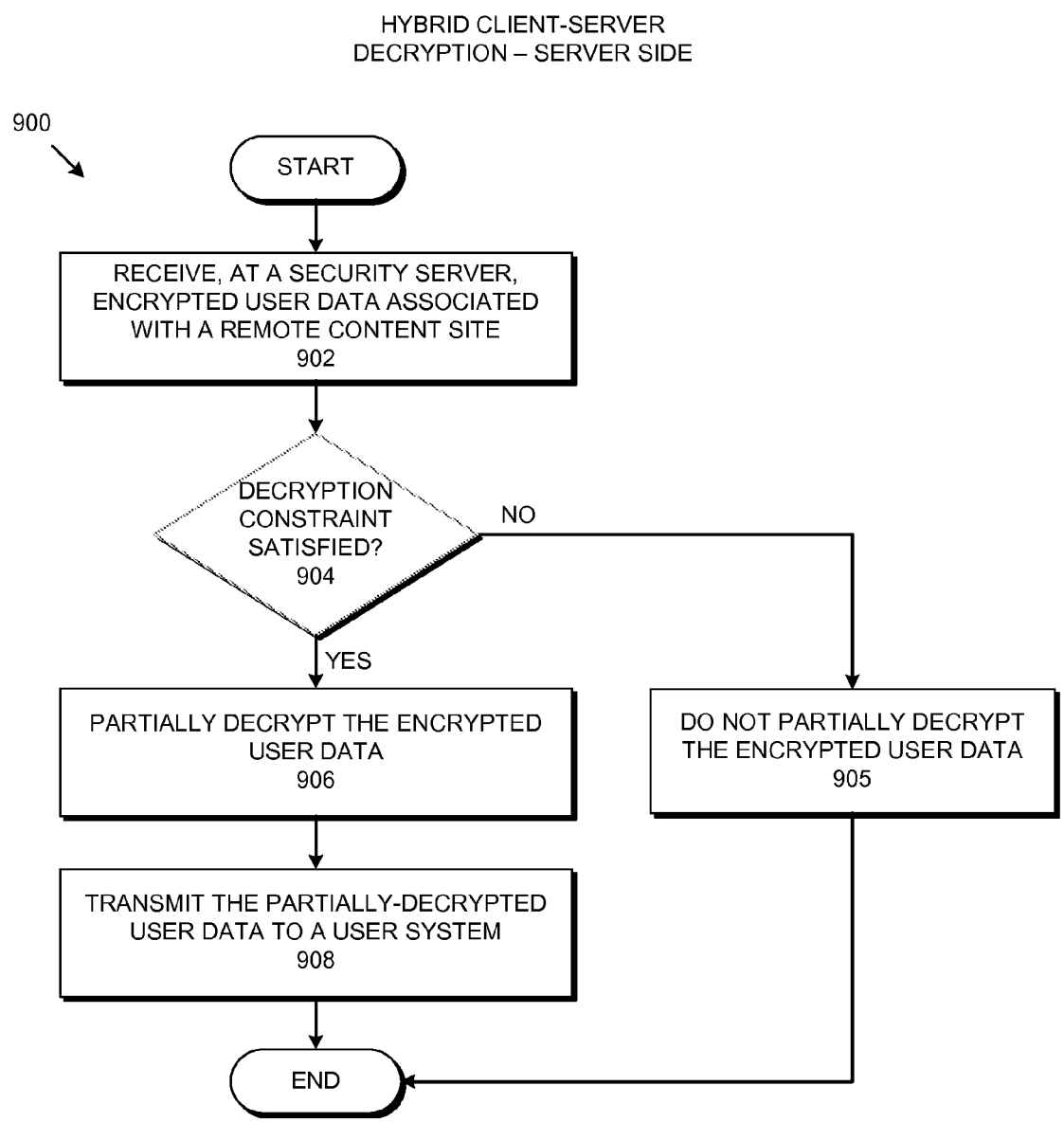
FIG. 9 illustrates a flow diagram for another embodiment of a hybrid client-server cryptography process, from the server point of view.

To enhance the security of user data, it can be useful to perform at least some of the encryption, signing, and/or decryption using both the client device 120 and the security system 170 (or the content site 132 itself). In one embodiment, encryption is performed by the client device 120 (e.g., via one or more public keys), while signing and decryption are performed by both the client device 120 and the security system 170. The client device 120 and the security system 170 can each have different private keys (e.g., data encryption keys) that are both used for signing and/or decryption. Advantageously, such hybrid client-server cryptography can enhance security of user data by guarding against loss or theft of one of the two private keys. FIGS. 8 and 9 illustrate more detailed embodiments of hybrid client-server cryptography.

FIG. 8 illustrates an embodiment of a hybrid client-server cryptography process 800, from the client point of view. The process 800 can be implemented by any of the client devices or user systems described above. Advantageously, in certain embodiments, the process 800 can increase security of a user's data.

At block 802, encrypted user data associated with a remote content site is obtained. The security module 126 can obtain this encrypted user data. At block 804, the encrypted user data is sent to a remote security server (such as the security system 170 or the content site 132). The security module 126 can send the encrypted user data to the remote security server, together with a request to partially decrypt the encrypted user data. In response, the remote security server can use its private key to partially decrypt the encrypted user data. The remote security server can also use the private key to confirm whether a first signature of the encrypted user data, if present, is authentic.

At block 806, partially-decrypted user data is received from the remote security server and is decrypted at block 808 to obtain the user data. The security module 126 can receive the partially-decrypted user data and direct it to the cryptography manager 124 for further decryption using a second private key. The cryptography manager 124 can also determine whether a second signature associated with the encrypted user data, if present, is authentic. The cryptography manager 124 can then provide the fully-decrypted user data to the security module 126.

The user data is provided to a network application at block 810, for example, by the security module 126. The network application can then output the user data in conjunction with a content page obtained from a remote content site.

By relying on two private keys for decrypting the encrypted user data, the hybrid client-server cryptography process 800 can guard against theft or loss of one of the keys. For instance, if it is discovered at the client device 120 that the private key of the client device 120 has been compromised, the client device 120 can send a message to the remote security server to disable the remote security server's private key. In response to receiving this message, the remote security server can cease to use the private key (e.g., until instructed otherwise by the client device 120) or can delete the private key. Similarly, the remote security server can instruct the client device 120 to disable the client device's 120 private key in response to detecting loss or theft of the server's private key.

It should be noted that at least some elements of the process 800 can be implemented by the remote security server instead of by the user system. For instance, the user system can perform the partial decryption of the user data, and the remote security server can perform the remainder of the decryption.

FIG. 9 illustrates another embodiment of a hybrid client-server cryptography process 900, from the server point of view. The process 900 can be implemented by the security systems 170, the security application 172, and/or the server-side encryption manager 174 described above. Further, the process 900 can also be implemented by the content site 132 in some embodiments. Advantageously, in certain embodiments, the process 900 increases security of a user's data.

At block 902, encrypted user data associated with a remote content site is received at a security server. The encrypted user data can be received from the client device 120, or alternatively, can be received directly from the content site 132.

At block 904, it is determined whether a decryption constraint is satisfied. The decryption constraint can be a time constraint, for instance, that allows decryption during a specified time frame. The time constraint can set an expiration after which the user data can no longer be decrypted. For example, a user may wish to allow a financial aggregator to be able to decrypt the user's data for 30 days (or some other specified time), after which time the user may wish to explicitly opt-in to allow the financial aggregator with continued access. The time constraint can be specified in the IEM itself upon creation of the IEM and/or upon access of the IEM from the content site 132. The time constraint can be specified by the user who created the IEM (e.g., via the security module 126 or security application 172), by the content site 132, or by the security system 170.

Another example of a decryption constraint is a location-based constraint, which allows decryption if the decryption request originates from an authorized location. For instance, decryption may be allowed if the request originates from within a particular country, network, or a more specific geographic area (such as within 10 miles of the IEM-creating user's residence). Location-based constraints can be specified by users via the security module 126 (or security application 172), thereby allowing users to have greater control over the decryption of the users' data. Location-based constraints can also be specified by the content site 132 or the security system 170. The location-based constraint can be checked by accessing a recipient's IP address and determining the location based on the IP address (e.g., from an IP-location database or the like). The requestor's location can also be determined by accessing location data provided by the requestor's computing device, such as Global Positioning System (GPS) data provided by a mobile device.

In one embodiment, both a time and a location decryption constraint can be applied to an IEM. The security server can therefore check whether each constraint is satisfied before performing partial decryption. Decryption constraints can also be optional in other implementations. Additional decryption constraints can also be used. Further, decryption constraints can also be applied outside of the hybrid client-server cryptography scenario, for example, in any of the client or server side cryptography scenarios described above.

If it is determined that the decryption constraint is not satisfied, the encrypted data is not partially decrypted at block 905, and the process 900 ends. For instance, if the encrypted user data is received by the security server outside of a specified time frame, the encrypted user data may not be partially decrypted. Such a time constraint can reduce the risk of theft of the user data in case the client device's 120 private key was compromised.

Otherwise, if the decryption constraint is satisfied, the encrypted user data is partially decrypted at block 906. The encrypted user data can be partially decrypted as described above with respect to FIG. 8, using a private key different from a private key employed by the client device 120. The partially-decrypted user data is transmitted to a user system (e.g., the client device 120) at block 908, thereby allowing the user system to complete decryption of the user data. In one embodiment, prior to fully decrypting the user data, the user system also checks one or more of the decryption constraints described above.

As with the process 800, certain elements of the process 900 can be implemented by the user system instead of the remote security server. For instance, the user system can check the decryption constraint and perform the partial decryption of the user data, and the remote security server can perform the remainder of the decryption.

Terminology

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of securely storing user data over a network, the method comprising:

by one or more computer systems comprising computer hardware:

intercepting user data associated with a user from a local network application, the user data sent by the local network application to a remote network application implemented in a remote content site configured to provide access to the remote network application, the remote network application capable of storing and sharing data received from the user with other users of the remote network application;

responsive to intercepting the user data, accessing a remote network application to determine one or more data fields from a set of data fields accessible at the remote network application that are capable of accepting encrypted data, wherein at least some fields from the set of data fields are not eligible to store encrypted data, and wherein said accessing the remote network application to determine the one or more data fields further comprises overriding an indication that at least one data field is not eligible to store encrypted data and including the at least one data field in the one or more data fields that are capable of accepting encrypted data;

determining whether the user data is associated with the one or more data fields; and in response to determining that the user data is associated with the one or more data fields:

encrypting the user data with a data encryption key to obtain encrypted user data;

encrypting the data encryption key with one or more keys of authorized recipients to produce one or more receiver keys, the authorized recipients comprising users with accounts at the remote network application who are associated with the user at the remote network application; and providing a message comprising the encrypted user data and the one or more receiver keys to the local network application, such that the local network application is configured to direct the message to the remote network application for storage.

2. The method of claim 1, wherein said intercepting the user data comprises accessing the user data from a content page obtained by the local network application.

3. The method of claim 2, wherein the local network application is a web browser.

4. The method of claim 1, wherein the message is configured to conform with a storage format of the remote network application so as to be storable at the remote content site in place of the user data.

5. The method of claim 4, wherein the storage format of the remote network application is specified in a form field of a content page received by the local network application.

6. The method of claim 4, wherein the storage format specifies a maximum length of data that can be stored by the remote network application.

7. The method of claim 4, wherein the storage format specifies an encoding type for data that can be stored by the remote network application.

8. The method of claim 1, further comprising sending test data to the remote network application prior to providing the message to the local network application, said sending configured to confirm whether the test data conforms to the storage format of the remote network application.

9. The method of claim 1, wherein the message is configured to be decryptable by a client device operated by one of the authorized recipients.

10. The method of claim 1, wherein said encrypting the user data is configured to enable the content site to eliminate a username and password requirement to access the user data.

11. The method of claim 10, wherein the local network application is implemented in a mobile device.

12. The method of claim 1, wherein said accessing the remote network application to determine the one or more data fields further comprises accessing metadata associated with each of the one or more data fields to determine whether the data field is capable of accepting encrypted data.

13. The method of claim 1, wherein said accessing the remote network application to determine the one or more data fields further comprises presenting a user with an option to override an indication that at least one data field is not eligible to store encrypted data.

14. A system for securely storing user data over a network, the system comprising:

one or more computer systems comprising computer hardware, the one or more computer systems programmed to implement:

a security system configured to:

intercept user data associated with a user from a local network application executing on a client device, the user data sent by the local network application to a remote network application implemented in a remote server configured to provide access to the remote network application, the remote network application capable of storing and sharing data received from the user with other users of the remote network application;

access a remote network application to determine one or more data fields from a set of data fields accessible at the remote network application that are capable of storing encrypted data, wherein at least some fields from the set of data fields are not eligible to store encrypted data;

override an indication that at least one data field is not eligible to store encrypted data and include the at least one data field in the one or more data fields that are capable of accepting encrypted data, determine whether the user data is associated with the one or more data fields; and in response to determining that the user data is associated with the one or more data fields, direct the user data to a cryptography manager stored in a memory of the one or more computer systems; and the cryptography manager configured to:

encrypt the user data with a data encryption key to obtain encrypted user data;

encrypt the data encryption key with one or more keys of authorized recipients to produce one or more receiver keys, the authorized recipients comprising users with accounts at the remote network application who are associated with the user at the remote network application; and provide a message comprising the encrypted user data and the one or more receiver keys to the security system, the security system thereby configured to enable the local network application to transmit the message to the remote network application thereby enabling the remote network application to store the encrypted user data instead of the user data.

15. The system of claim 14, wherein the security system comprises a plug-in that interfaces with the local network application.

16. The system of claim 14, wherein the data encryption key is a symmetric key.

17. The system of claim 14, wherein the one or more keys of the authorized recipients comprise one or more public keys.

18. The system of claim 17, wherein each of the one or more receiver keys are configured to be decryptable by a private key of one of the authorized recipients.

19. The system of claim 18, wherein the cryptography manager is configured to create recovery information associated with the private key using a secret-sharing algorithm, and wherein the cryptography manager can create a copy of the private key using a subset of the recovery information.

20. The system of claim 14, wherein the cryptography manager is further configured to:

divide the user data into a first data subset and a second data subset, wherein the first data subset is associated with a first authorization level and the second data subset is associated with a second authorization level;

encrypt the first data subset with a first data encryption key and encrypt the second data subset with a second data encryption key; and encrypt the first data encryption key with one or more keys of a first set of authorized recipients associated with the first authorization level and the second data encryption key with one or more keys of a second set of authorized recipients associated with the second authorization level to produce the one or more receiver keys.

21. The system of claim 14, wherein the message is configured to conform with a storage format of the remote network application so as to be storable in place of the user data.

22. A non-transitory computer-readable storage medium comprising computer-executable instructions configured to implement a method of securely storing user data over a network, the method comprising:

intercepting user data associated with a user from a local network application executing on a client device, the user data sent by the local network application to a remote network application of a content site configured to provide access to the remote network application;

responsive to intercepting the user data, accessing the remote network application to determine one or more data fields from a set of data fields accessible at the remote network application that are capable of accepting encrypted data, wherein at least some fields from the set of data fields cannot accept encrypted data, and wherein said accessing the remote network application to determine the one or more data fields further comprises overriding an indication that at least one data field is not eligible to store encrypted data and including the at least one data field in the one or more data fields that are capable of accepting encrypted data;

determining whether the user data is associated with the one or more data fields; and in response to determining that the user data is associated with the one or more data fields:

encrypting the user data to obtain encrypted user data;

creating an encryption message configured to include the encrypted user data and recipient data reflecting two or more authorized recipients of the encryption message, the two or more authorized recipients comprising users with accounts at the remote network application who are associated with the user at the remote network application; and providing the encryption message to the local network application, such that the local network application is configured to transmit the message to the remote network application of the content site.

23. The non-transitory computer-readable storage medium of claim 22, wherein the recipient data comprises a receiver key for each of the authorized recipients.

24. The non-transitory computer-readable storage medium of claim 23, wherein the receiver key comprises an encrypted form of an encryption key used to encrypt the user data.

25. The non-transitory computer-readable storage medium of claim 22, wherein the encryption message comprises a length configured to conform with storage requirements of the content site.

26. The non-transitory computer-readable storage medium of claim 22, wherein the user data is configured to be formatted in a standard data format.

27. The non-transitory computer-readable storage medium of claim 26, wherein the standard data format comprises one or more of the following: HyperText Markup Language (HTML), Extensible Markup Language (XML), and JavaScript Object Notation (JSON).

28. The non-transitory computer-readable storage medium of claim 22, wherein the method further comprises authorizing a third recipient to access the encrypted user data.

29. The non-transitory computer-readable storage medium of claim 28, wherein said authorizing comprises:

adding new recipient data for the third recipient to the encryption message to produce a second encryption message; and transmitting the second encryption message to the remote network application so as to replace the encryption message with the second encryption message.

30. The non-transitory computer-readable storage medium of claim 28, wherein said authorizing comprises sending new recipient data corresponding to the third recipient to the content site for storage with the encryption message.

* * * * *